(12) United States Patent
Neet et al.

(10) Patent No.: US 11,165,319 B2
(45) Date of Patent: Nov. 2, 2021

(54) METHOD OF FORMING A STATOR HAVING SKEWED SLOTS

(71) Applicant: BorgWarner Inc., Auburn Hills, MI (US)

(72) Inventors: Kirk Neet, Pendleton, IN (US); Seong Taek Lee, Lexington, KY (US)

(73) Assignee: BORGWARNER INC., Auburn Hills, MI (US)

( * ) Notice: Subject to any disclaimer, the term of this patent is extended or adjusted under 35 U.S.C. 154(b) by 173 days.

(21) Appl. No.: 16/434,600

(22) Filed: Jun. 7, 2019

(65) Prior Publication Data

US 2020/0389076 A1 Dec. 10, 2020

(51) Int. Cl.
*H02K 15/00* (2006.01)
*H02K 15/085* (2006.01)

(52) U.S. Cl.
CPC ...... *H02K 15/085* (2013.01); *Y10T 29/49009* (2015.01); *Y10T 29/49073* (2015.01)

(58) Field of Classification Search
CPC ........ H02K 3/28; H02K 1/16; H02K 15/0056; H02K 3/02; H02K 15/0478; H02K 23/30; Y10T 29/49009; Y10T 29/49012; Y10T 29/53143; Y10T 29/49073; Y10S 164/10; Y10S 174/20
USPC .................. 29/596, 598, 606, 609, 732, 735
See application file for complete search history.

(56) References Cited

U.S. PATENT DOCUMENTS

| | | | |
|---|---|---|---|
| 6,940,202 B1 | 9/2005 | Chen et al. | |
| 7,005,772 B1 | 2/2006 | Frederick et al. | |
| 7,081,697 B2 | 7/2006 | Neet | |
| 7,170,211 B2 | 1/2007 | Chen et al. | |
| 7,365,467 B2 | 4/2008 | Bramson et al. | |
| 7,386,931 B2 | 6/2008 | Neet et al. | |
| 7,432,626 B2 | 10/2008 | Neet | |
| 7,788,790 B2 | 9/2010 | Neet | |
| 7,911,105 B2 | 3/2011 | Neet | |
| 8,393,072 B2* | 3/2013 | Bodin | H02K 15/066 29/596 |
| 9,467,010 B2 | 10/2016 | Stephenson et al. | |

(Continued)

FOREIGN PATENT DOCUMENTS

WO WO02080337 A1 10/2002
WO WO2018221449 A1 12/2018

OTHER PUBLICATIONS

International Search Report and Written Opinion for International Application No. PCT/US2020/035653; International Filing Date Jun. 2, 2020; Report dated Sep. 28, 2020 (pp. 1-10).

*Primary Examiner* — Thiem D Phan
(74) *Attorney, Agent, or Firm* — Cantor Colburn LLP

(57) ABSTRACT

A method of inserting a winding into a stator having skewed slots formed on an inside diameter of a stator lamination includes forming a conductor having a plurality of slot segments, loading the conductor into a plurality of skewed slot elements of a linear cartridge having a first end, a second end, and a linear axis connecting the first end and the second end, the plurality of skewed slot elements being angled relative to the linear axis, transferring the conductor from the linear cartridge to a plurality of skewed slot members formed in an outside diameter of a rotary cartridge, inserting the rotary cartridge into the inside diameter of the stator lamination, and shifting the conductor from the rotary cartridge into the skewed slots of the stator.

14 Claims, 3 Drawing Sheets

(56) References Cited

U.S. PATENT DOCUMENTS

| | | | |
|---|---|---|---|
| 10,476,358 B2 * | 11/2019 | Huang | H02K 15/0012 |
| 2006/0152100 A1 | 7/2006 | Chen et al. | |
| 2006/0226727 A1 | 10/2006 | Bramson et al. | |
| 2009/0096311 A1 | 4/2009 | Even | |
| 2009/0121576 A1 | 5/2009 | Even et al. | |
| 2019/0020237 A1 | 1/2019 | Neet | |

* cited by examiner

METHOD OF FORMING A STATOR HAVING SKEWED SLOTS

BACKGROUND OF THE INVENTION

Exemplary embodiments pertain to the art of electric machines and, more particularly, to a method of forming a stator having skewed lamination slots.

Electric machines include stators which support one or more conductors that define a stator winding(s). The stator is formed from a plurality of stacked laminations and includes a plurality of slots that are receptive of the one or more conductors. The plurality of slots, which in turn define stator teeth, are typically aligned with an axis of rotation of a rotor of the electric machine. Aligning the plurality of slots with the axis of rotation promotes inserting the one or more conductors to form the stator winding(s).

In certain electric machines, the stator is formed with the plurality of slots being skewed relative to the axis of rotation of the rotor. Skewing the plurality of stator slots reduces torque ripple and magnetic noise by effectively controlling energization of the stator teeth. That is, skewing the plurality of slots assures that all of the stator teeth are not simultaneously energized. Skewing the plurality of slots is performed on stator laminations having the winding mounted on an outside diameter. Inserting conductors into skewed slots that are formed on an inside diameter of a stator is at best difficult and at worst impossible. Therefore, the art would appreciate a system for inserting a winding into skewed slots formed in an inside diameter of a stator.

BRIEF DESCRIPTION OF THE INVENTION

Disclosed is a method of inserting a winding into a stator having skewed slots formed on an inside diameter of a stator lamination including forming a conductor having a plurality of slot segments, loading the conductor into a plurality of skewed slot elements of a linear cartridge having a first end, a second end, and a linear axis connecting the first end and the second end, the plurality of skewed slot elements being angled relative to the linear axis, transferring the conductor from the linear cartridge to a plurality of skewed slot members formed in an outside diameter of a rotary cartridge, inserting the rotary cartridge into the inside diameter of the stator lamination, and shifting the conductor from the rotary cartridge into the skewed slots of the stator.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
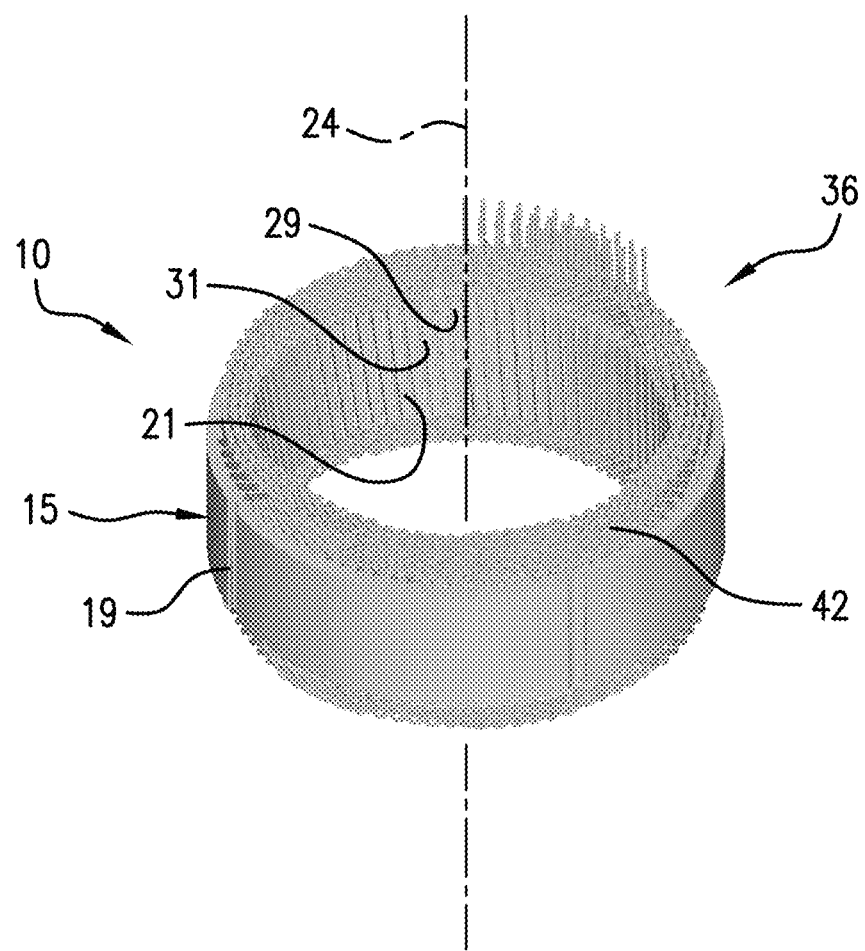
FIG. 1 depicts a stator core including skewed slots, in accordance with an aspect of an exemplary embodiment.

A stator for an electric machine is indicated generally at 10 in FIG. 1. Stator 10 includes a stator body 15 formed from one or more laminations (not separately labeled). Stator body 15 includes an outer surface 19 defining an outer diameter or OD and an inner surface 21 defining an inner diameter or ID. Stator body 15 includes a central axis 24 that passes through a focus of the ID.

A plurality of skewed stator slots, one of which is indicated at 29 is formed in inner surface 21. Skewed stator slots 29 are angled relative to central axis 24. Skewed stator slots 29 define a plurality of skewed stator teeth, one of which is indicated at 31. Stator 10 supports a winding 36 that defines a number of electrical phases. The number of phases may vary. The electrical phases may be connected in various configurations such as wye connections and delta connections. Each phase is formed from one or more electrical conductors such as shown at 42.

Figure 2:
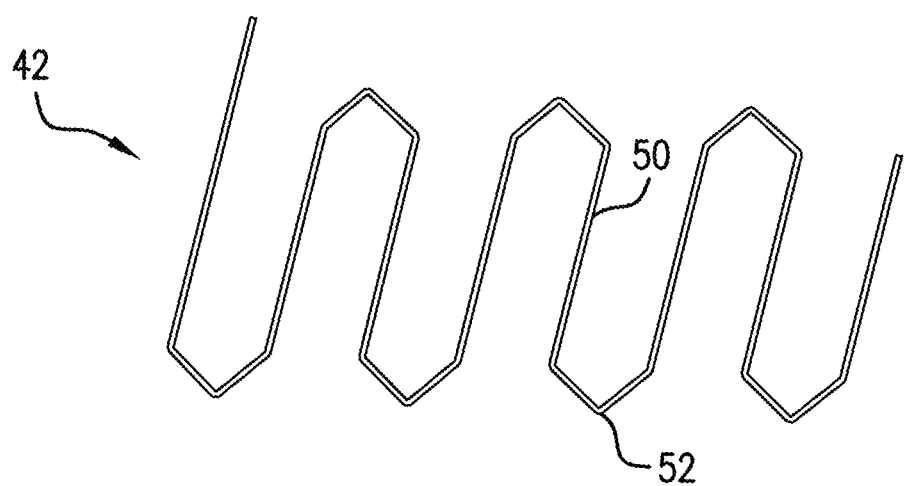
FIG. 2 depicts a conductor including skewed slot segments, in accordance with an aspect of an exemplary embodiment.

Referring to FIG. 2, conductor 42 includes a plurality of slot segments, one of which is indicated at 50 that are joined by end turn bends, one of which is indicated at 52. Slot segments 50 may be initially formed to be substantially parallel to an axis of rotation of the electric machine or, as shown in FIG. 2, may be formed to be at an angle relative to the axis of rotation of the electric machine. In an embodiment, the axis of rotation of the electric machine would be substantially aligned with the focus of the ID defined by inner surface 21.

According to one exemplary aspect, slot segments 50 may be formed skewed to the selected angle during the process of forming the wire. According to another exemplary aspect, slot segments 50 may be initially formed parallel to the axis of rotation of the electric machine and then subsequently skewed during (or just prior t) introducing slot segments 50 into the plurality of skewed slot elements 62 of linear cartridge 56 (described in more detail below).

Figure 3:
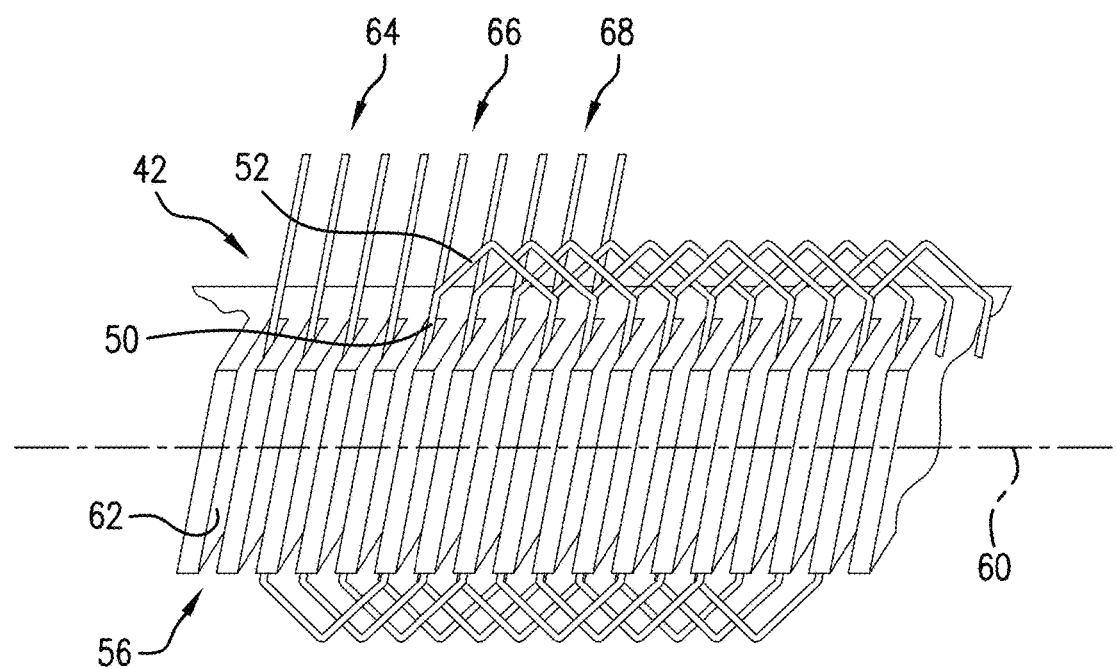
FIG. 3 depicts a linear cartridge receptive of the conductor of FIG. 2, in accordance with an aspect of an exemplary embodiment.

In accordance with an aspect of an exemplar embodiment, the selected angle is between about 1° and about 3°. The selected angle is defined as the angle relative to the axis of rotation of the electric machine or the angle relative to 90 degrees from the linear axis 60 of liner cartridge such as shown in FIG. 3. In accordance with another aspect of an exemplary embodiment, the selected angle corresponds to a width of one of the plurality of stator teeth 31 from one axial end to the another axial end of stator body 15. With this arrangement, a tangent of the selected angle equals the width of one of the plurality of stator teeth 31 divided by an axial length of stator body 15. The width of one of the plurality of stator teeth 31 is defined as the width of one of the plurality of stator teeth 31, if the teeth were not skewed. In accordance with another aspect of the exemplary embodiment, the tangent of the selected angle is less than the width of one of the plurality of stator teeth 31 divided by the axial length of stator body 15.

In an embodiment, conductor 42 is loaded into a linear cartridge 56 that extends along a linear axis 60 as shown in FIG. 3. Linear cartridge 56 includes a plurality of skewed slot elements 62. Plurality skewed slot elements 62 are arranged at an angle relative to linear axis 60 that is substantially similar to 90 degrees minus the selected angle. That is, plurality of skewed slot elements 62 are arranged at an angle of between about 1° and about 3° relative to ninety degrees from the linear axis 60. Conductor 42 may form part of a first electrical phase 64. Additional conductors (not separately labeled) forming a second electrical phase 66 and a third electrical phase 68 may also be loaded into linear cartridge 56. Additional conductors (not shown) forming additional parallel wires or additional electrical phases (also not shown) may also be loaded into linear cartridge 56.

Figure 4:
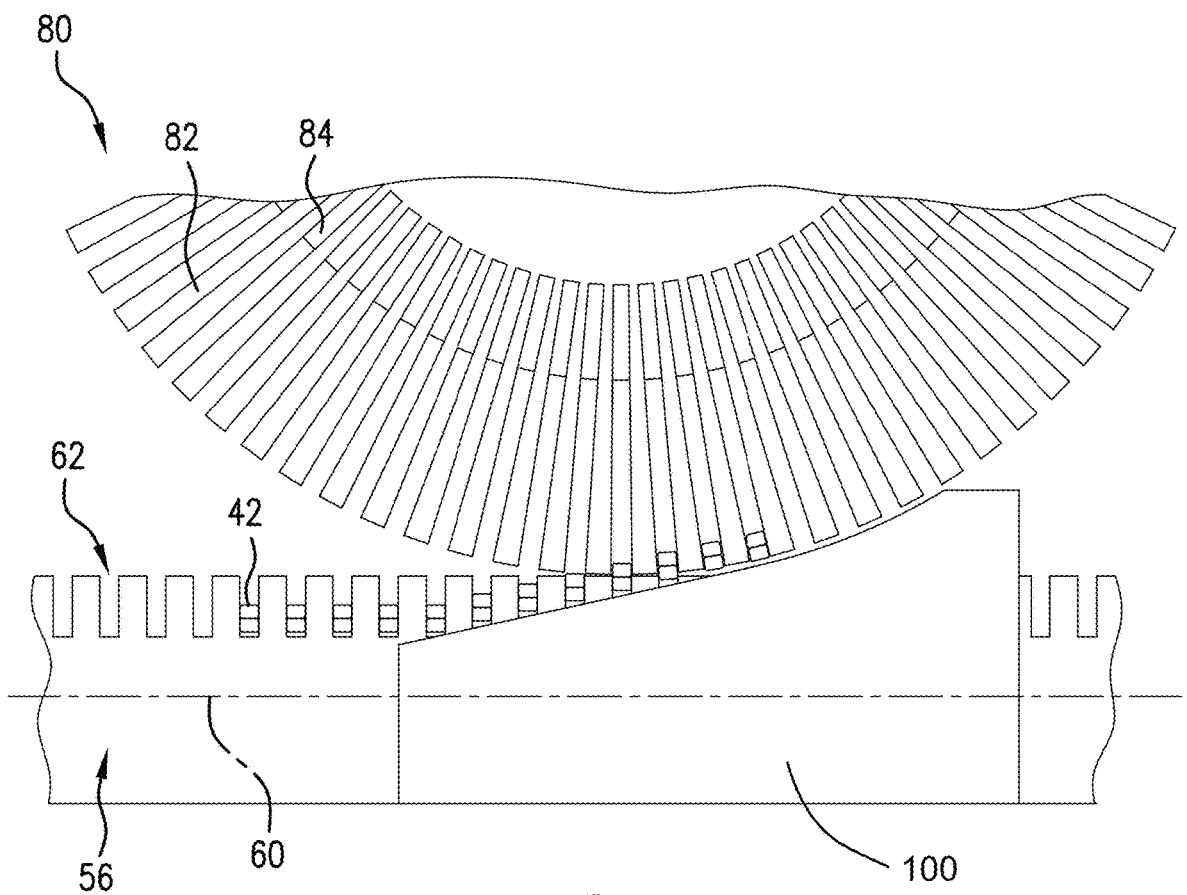
FIG. 4 depicts a rotary cartridge having skewed slot members being loaded from the linear cartridge of FIG. 3, in accordance with an aspect of an exemplary embodiment.
Figure 5:
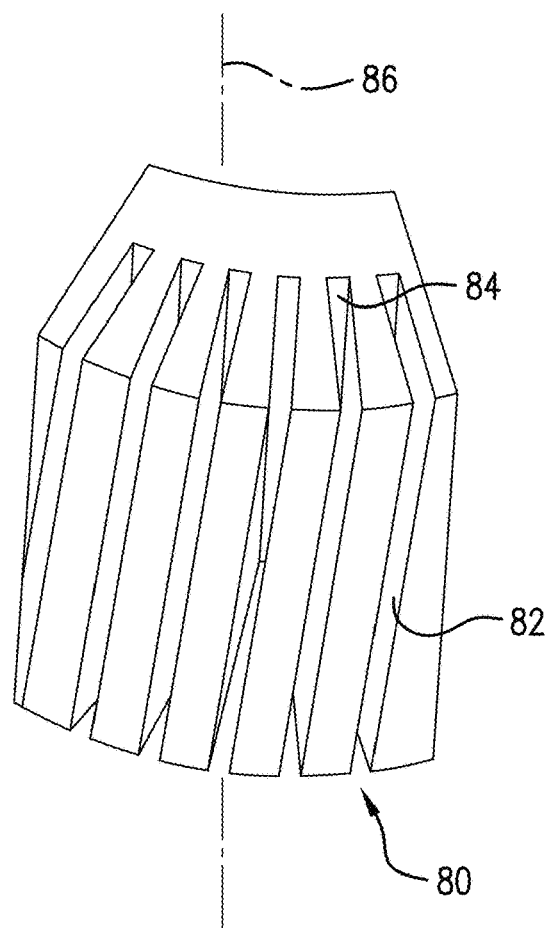
FIG. 5 depicts the skewed slot members of the rotary cartridge of FIG. 4, in accordance with an aspect of an exemplary embodiment.

Linear cartridge 56 may be formed so as to be manipulated about a rotary cartridge 80 shown in FIG. 4. having a plurality of skewed slot members 82 such as shown in rotary cartridge 80 includes a plurality of slot fingers 84 arranged in each of the plurality of skewed slot members 82 that may be selectively extended through each of the plurality of skewed slot members 82 as will be discussed herein. Plurality of skewed slot members 82 are arranged about a central axis 86. In an embodiment, plurality of skewed slot members 82 are arranged at an angle relative to central axis 86 as shown in FIG. 5. Skewed slot members 82 are arranged at an angle relative to central axis 86 that is substantially similar to the selected angle. That is, plurality of skewed slot members 82 are arranged at an angle of between about 1° and about 3° relative to central axis 86.

In accordance with an exemplary aspect, conductors 42 are loaded into linear cartridge 56 are then transferred into rotary cartridge 80. More specifically linear cartridge 56 may be positioned relative to rotary cartridge 80 so that conductors 42 may be transferred from plurality of slot elements 62 into plurality of slot members 82. A ramped guide member 100 (FIG. 4) may facilitate transfer of conductors 42 from skewed slot elements 62 of linear cartridge 56 into slot members 82 of rotary cartridge 80. In this manner, each conductor remains in a selected position and angle relative to other conductors. One or more winding layers (not separately labeled) may be transferred from linear cartridge 56 into rotary cartridge 80 in one or more transfer operations. That is, an entire winding (not separately labeled) for stator 10 may be loaded into rotary cartridge 80 from linear cartridge 56 in one or more loading operations.

Figure 6A:
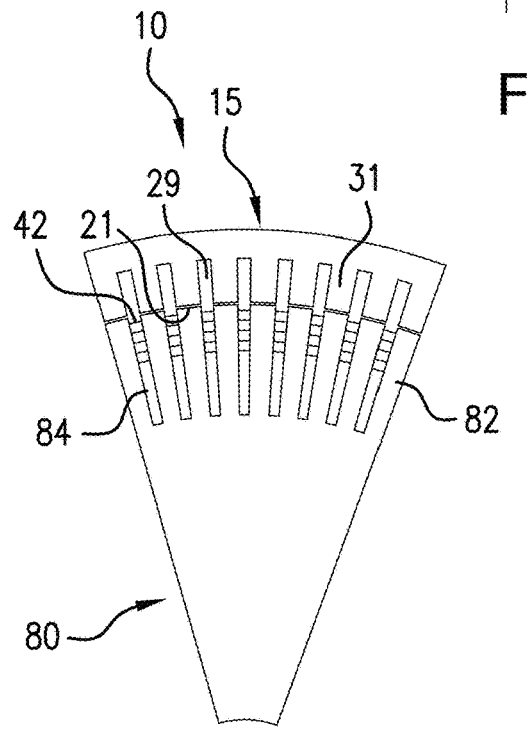
FIG. 6A depicts the conductor being shifted from the rotary cartridge of FIG. 4 toward the stator core, in accordance with an aspect of an exemplary embodiment.
Figure 6B:
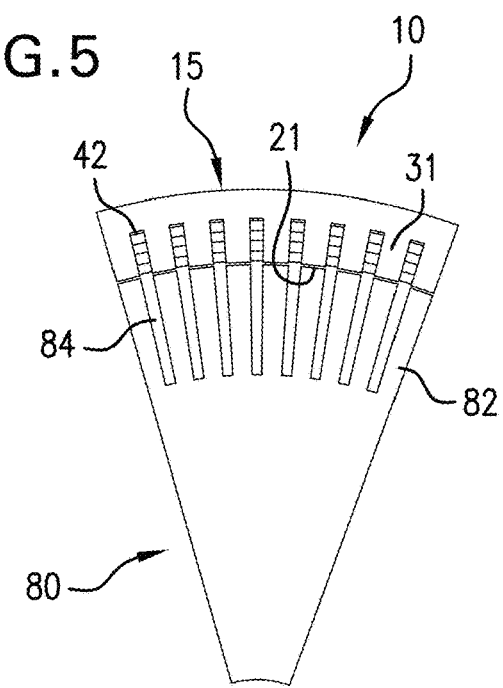
FIG. 6B depicts the conductors being received by the stator core.

In accordance with an exemplary aspect, once loaded, rotary cartridge 80 is inserted into the ID of stator 10 as shown in FIGS. 6A and 6B. Plurality of skewed slot members 82 are aligned with the plurality of skewed slots 29 of stator 10. Once aligned, slot fingers 84 may be shifted radially inwardly to transfer the winding from rotary cartridge 80 into stator 10. At this point, the phases may be connected and additional actions taken to complete stator 10. Once complete, stator 10 may be installed in a housing (not shown) to form part of an electric machine (also not shown). At this point, it should be understood that the exemplary describe a system for introducing a winding into skewed slots formed in an ID of a stator. The stator thus formed reduces torque ripple and magnetic noise by effectively controlling energization of the stator teeth.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of inserting a winding into a stator having skewed slots formed on an inside diameter of a stator lamination comprising:
    forming a conductor having a plurality of slot segments;
    loading the conductor into a plurality of skewed slot elements of a cartridge having a first end, a second end, and an axis connecting the first end and the second end, the plurality of skewed slot elements being angled relative to the axis;
    transferring the conductor from the cartridge to a plurality of skewed slot members formed in an outside diameter of a rotary cartridge;
    inserting the rotary cartridge into the inside diameter of the stator lamination; and
    shifting the conductor from the rotary cartridge into the skewed slots of the stator.

2. The method of claim 1, wherein loading the conductor includes loading a first conductor of associated with a first electrical phase into a first plurality of the plurality of skewed slot elements, a second conductor associated with a second electrical phase into a second plurality of the plurality of skewed slot elements, and a third conductor of a third electrical phase into a third plurality of the plurality of skewed slot elements of the cartridge.

3. The method of claim 1, wherein loading the conductor includes loading a first electrical phase into the cartridge, a second electrical phase into the cartridge, and a third electrical phase into the cartridge.

4. The method of claim 3, wherein shifting the conductor includes shifting the first electrical phase, the second electrical phase, and the third electrical phase into the stator.

5. The method of claim 4, wherein shifting the first electrical phase, the second electrical phase, and the third electrical phase includes substantially simultaneously shifting the first electrical phase, the second electrical phase, and the third electrical phase into the stator.

6. The method of claim 1, wherein forming the conductor includes first forming the slot segments parallel and then imparting an angle to the plurality of slot segments before loading the cartridge.

7. The method of claim 1, wherein loading the conductor into the plurality of skewed slot elements of the cartridge includes loading the conductor into the plurality of skewed slot elements arranged at an angle between about 1° and about 3° relative to 90 degrees from the axis.

8. The method of claim 1, wherein forming the conductor includes first forming the slot segments parallel and then imparting an angle to the plurality of slot segments while loading into the cartridge.

9. The method of claim 1, wherein shifting the conductor from the rotary cartridge into the skewed slots of the stator, includes shifting the conductor from the skewed slots formed in the outside diameter of the rotary cartridge having a selected angle, into the skewed slots of the stator having the same selected angle.

10. The method of claim 9, wherein transferring the conductor from the cartridge to the plurality of skewed slot members formed in an outside diameter of the rotary cartridge, includes transferring the conductor from the slots of the cartridge having the same selected angle.

11. The method of claim 10, wherein loading the conductor into the plurality of skewed slot elements of the cartridge includes loading the conductor into the plurality of skewed slot elements arranged at an angle between about 1° and about 3° relative to 90 degrees from the axis.

12. The method of claim 11, wherein transferring the conductor from the cartridge to the plurality of skewed slot members formed in an outside diameter of the rotary cartridge, includes transferring the conductor into the plurality of skewed slot members arranged at an angle between about 1 degree and 3 degrees relative to a central axis of the stator.

13. The method of claim 10, wherein the stator body includes a plurality of stator teeth and the selected angle equals the tangent of the width of one of the plurality of stator teeth divided by an axial length of the stator body.

14. The method of claim 10, wherein the stator body includes a plurality of stator teeth and the selected angle is less than the tangent of the width of one of the plurality of stator teeth divided by an axial length of the stator body.

* * * * *